Figure 6:
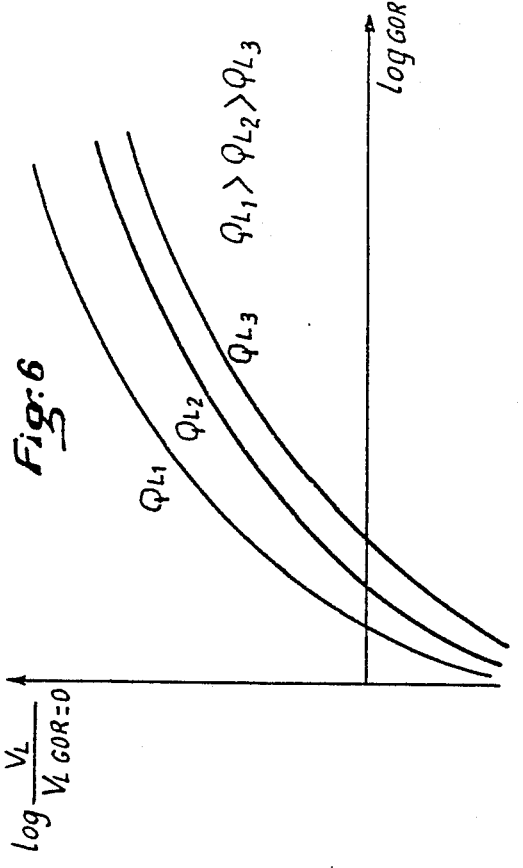

United States Patent [19]

Arnaudeau et al.

[11] Patent Number: 4,817,439
[45] Date of Patent: Apr. 4, 1989

[54] PROCESS AND APPARATUS FOR MEASURING TWO PHASE FLOW

[75] Inventors: Marcel Arnaudeau; Philippe Rousset, both of Paris, France

[73] Assignee: 501 Institut Francais du Petrole, France

[21] Appl. No.: 774,603
[22] PCT Filed: Dec. 31, 1984
[86] PCT No.: PCT/FR84/00305
 § 371 Date: Aug. 30, 1985
 § 102(e) Date: Aug. 30, 1985

[30] Foreign Application Priority Data

Dec. 30, 1983 [FR] France .................. 83 21088

[51] Int. Cl.$^4$ .................. G01F 1/74
[52] U.S. Cl. .................. 73/861.04; 73/200
[58] Field of Search .................. 73/861.04, 861.69, 200

[56] References Cited

U.S. PATENT DOCUMENTS 4,282,760 8/1981 Pitts, Jr. et al. .................. 73/861.69
4,312,234 1/1982 Rhodes et al. .................. 73/861.04

Primary Examiner—Herbert Goldstein
Attorney, Agent, or Firm—Parkhurst, Oliff & Berridge

[57] ABSTRACT

A two-phase fluid is rotated around a longitudinal axis so as to generate a coaxial flow having a tubular layer (15) formed by the gaseous phase surrounded by a tubular layer (16) formed by the liquid phase. The thicknesses of the tubular layers of the liquid phase and gaseous phase, and the flow velocity of at least the liquid phase (VL) is measured. The flow of each phase can then be determined from empirical data.

7 Claims, 2 Drawing Sheets

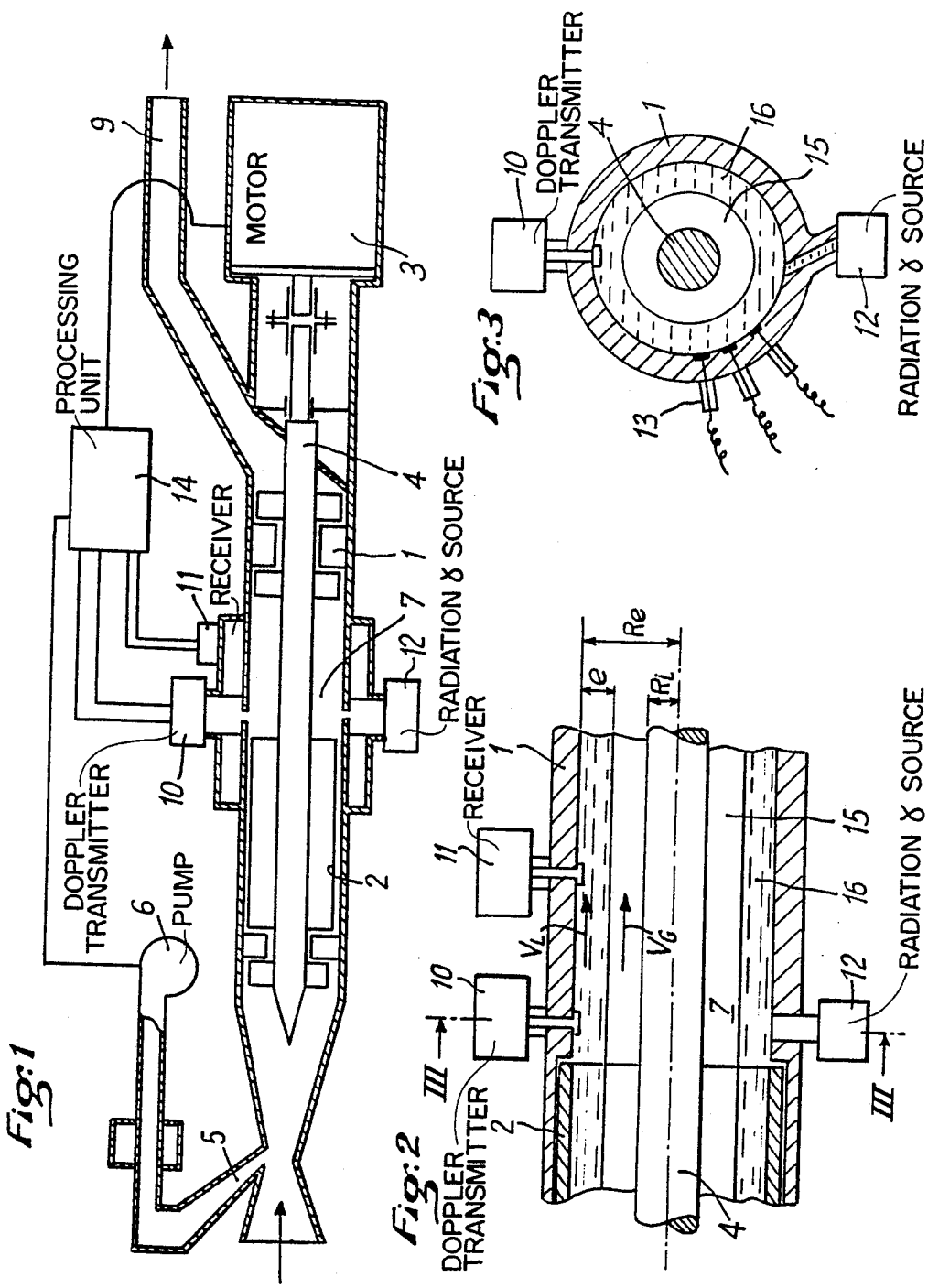

PROCESS AND APPARATUS FOR MEASURING TWO PHASE FLOW

This invention concerns a process and a device for measuring the feed of the liquid and gaseous phases of a two-phase flowing liquid Devices for pumping a two-phase fluid comprising a mixture of a liquid and a gas not dissolved in the liquid are already known, for example from. French patent application No. 79 31031 FR(2,471,501). However, these devices only operate satisfactorily for values of the feeds of the two phases and the volumetric ratio of the gaseous phase to the liquid phase (GOR), in thermodynamic flow conditions, between certain limits depending on the geometry and the kinematics of the device. Consequently regulating appliances are used which can ensure relatively constant feeds and volumetric ratios at the entrance to the pump.

To enable the operation of these regulating appliances, it is therefore necessary to measure precisely the values of the feed of each of the two phases and the volumetric ratio of the two-phase liquid upstream.

This invention aims to provide a process and a device enabling such measures to be carried out.

For this purpose, the scope of the invention is a process for measuring the feed of the liquid and gaseous phases of a two-phase fluid during flow, characterised in that the two-phase fluid is rotated around a longitudinal axis so as to generate a coaxial flow having a tubular layer formed from the gaseous phase surrounded by a tubular layer formed from the liquid phase., in that downstream from the zone where the said two-phase fluid has been rotated are measured on the one hand the thicknesses of the tubular layers of the liquid phase and gaseous phase and, on the other hand, the flow velocity of at least the liquid phase, and in that from the thickness and velocity values measured are determined, by comparison with mathematical and/or experimental models, the feed relating to volume and mass of each phase and also the volumetric ratio of the gaseous phase and the liquid phase under the thermodynamic conditions of the two-phase fluid.

These measures may be carried out in any suitable way, for example by the hot wire method or using a Pitot tube, but the thickness of the respective layers is preferably determined by measuring the differential absorption of radiation $\gamma$ in the said phases , and the flow velocities by Doppler effect.

In certain cases when this process is implemented the volumetric ratio is great, and the thickness of the liquid layer is then very small. The precision of the measurements can then be improved further if, for a short period of time, the thickness of the liquid layer is increased. This can be done by carrying out the measurements after adding to the flow of two-phase fluid a feed of liquid, in particular water, which is predetermined and/or by modifying the rotational velocity of the two-phase fluid.

In a particular embodiment of the invention measurements of thickness and velocity are carried out at predetermined intervals and the said admission of additional liquid and/or the modification of the rotational velocity of the fluid is caused when the current values for the thickness of the layers and/or the flow velocity deviate from the average corresponding values previously measured.

The scope of the invention is also a device for implementing the above process, characterised in that it comprises an exterior fixed tubular enclosure, a longitudinal axial shaft arranged in the said enclosure and connected to means enabling its rotation at determined variable velocities, a tubular enclosure mounted coaxially to the interior of the external enclosure and capable of being brought into rotation jointly with the said shaft, the said interior enclosure extending over one part only of the length of the exterior enclosure, means for introducing a two-phase fluid into the said exterior enclosure and means for removing two-phase fluid from the exterior enclosure down-stream from the interior enclosure, the exterior enclosure comprising, in a zone between the down-stream extremity of the interior enclosure and the said removal means, means for measuring the thickness of tubular layers of the gaseous phase and liquid phase formed in the said interior enclosure, and means for measuring the flow velocity of at least the liquid phase.

The said means for measuring the thickness may comprise a radiation $\gamma$ source and a plurality of radiation $\gamma$ detectors arranged opposite and the means for measuring the flow velocity may be of the Doppler effect type.

In a preferred embodiment of the invention means are provided to introduce a feed of liquid, in particular water, controlled up-stream from the said interior enclosure.

These means for introducing a feed of liquid may, for example, be of the type specified in French patent specification No. 82 17245 (FR 2,539,644).

Advantageously, the device according to the invention comprises an electric motor of variable speed to rotate the said shaft and the said interior enclosure.

Figure 7:
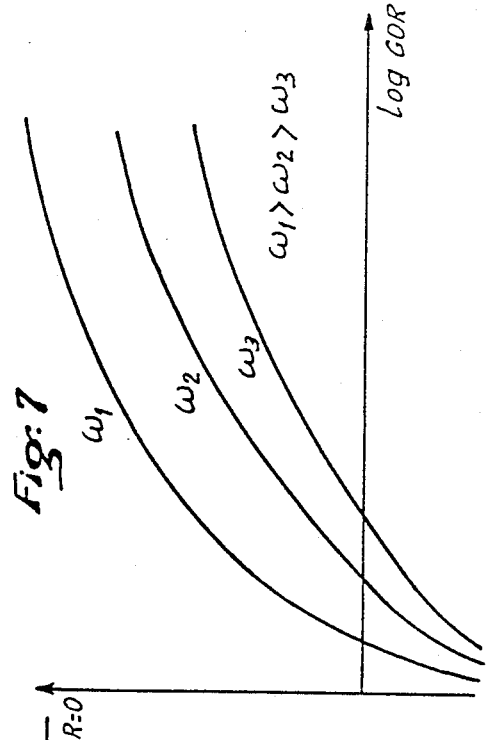
Figure 4:
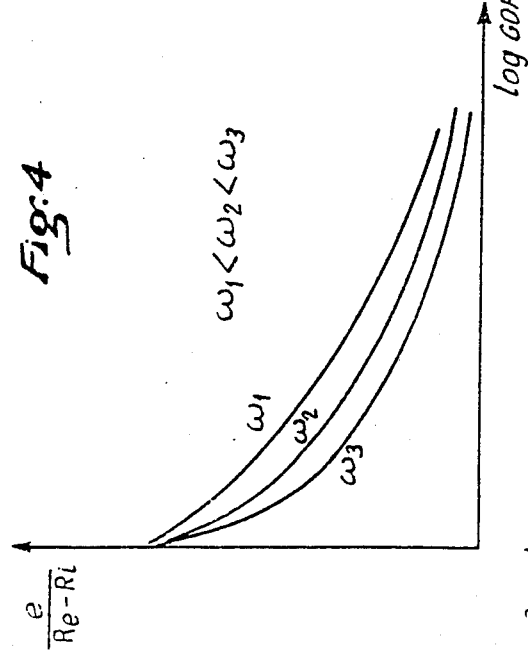
Figure 5:
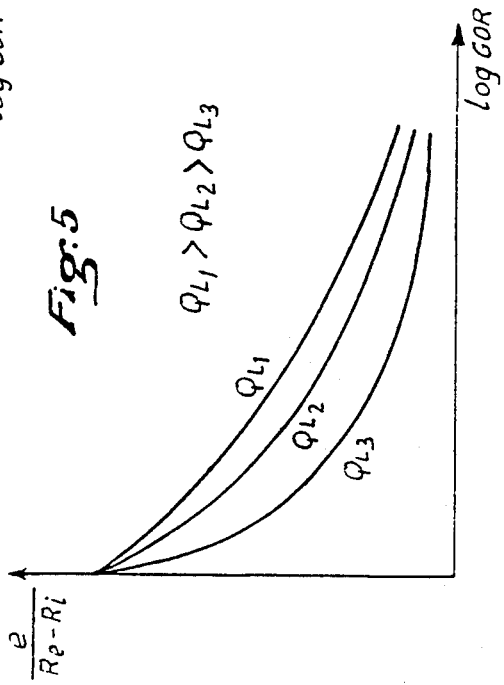

As an example a non-restrictive particular embodiment of the invention is now described with reference to the attached drawing in which;

FIG. 1 is a diagrammatic axial section of a measurement device in accordance with the invention, FIG. 2 is also an axial section, but on a larger scale, of the measurement zone of this device, FIG. 3 is a section along line III—III of FIG. 2, FIG. 4 illustrates the variation in thickness of the liquid layer of a coaxial two-phase flow as a function of the volumetric ratio of the gaseous to the liquid phase for different rotational velocities and a constant feed of liquid, FIG. 5 illustrates the variation in this same thickness as a function of the volumetric ratio for different feeds of the liquid phase at constant rotational velocity, FIG. 6 illustrates the variation of the velocity of the liquid phase as a function of the volumetric ratio for different liquid feeds a constant rotational velocity, and FIG. 7 illustrates the variation in the velocity of the liquid phase as a function of the volumetric ratio for different rotational velocities with constant liquid feed.

The measurement device represented in FIGS. 1 to 3 generally comprises a fixed tubular exterior enclosure 1 inside which is coaxially mounted an interior tubular enclosure 2 capable of being rotated by a variable speed motor 3, by the intermediary of a shaft 4.

A liquid injection device 5 such as, for example, that described in French patent application No. 82 17245 is provided at the entrance to the device and is fed by a pump 6. The measurement chamber 7 is situated immediately down-stream from the interior enclosure 2 and is followed by a flow regulating device of any known type 8 preceding the exit 9 of the device.

A Doppler transmitter 10 and a corresponding receiver 11 have their respective transducers arranged in the measurement chamber 7 along the generant of the exterior tubular enclosure 1.

A radiation γ source 12 and corresponding receivers 13 are arranged in the same transversal plane perpendicular to the shaft 4.

The entrances and exits of the measurement components 10, 11, 12 and 13 are connected to a processing unit 14 which is also designed to control the operation of the pump 6 and the variable speed motor 3.

In operation, the motor 3 driving the tubular enclosure 2 causes the rotation of the two-phase fluid penetrating into the device so that at the exit to this enclosure it occurs as an internal tubular flow of gas 15 and an external tubular flow of liquid 16 The gas flow has an axial velocity $V_G$ and the liquid flow has an axial velocity $V_L$.

The velocity $V_L$, is determined directly by the Doppler system 10, 11, whereas the thickness e of the liquid layer is determined by the processing unit 14 from signals supplied by the detectors 13. The radiation γ is in fact essentially absorbed by the liquid phase so that these signals are representative of the thickness e.

It is known that for a given geometry of the device, for a given rotational velocity of the enclosure 2, and for a determined two-phase feed and volumetric ratio, the thickness e of the liquid layer and also the velocities $V_G$ and $V_L$ of each phase are defined.

Consequently, knowledge of the thicknesses of the layers and their velocity enables the determination, by comparison with pre-ordained models, of the values of feed relating to volume and mass as well as true volumetric ratios, taking into consideration the sliding velocities of phases.

FIGS. 4 to 7 represent examples of such ratios between, on the one hand, the thickness e and the velocity $V_L$, and, on the other hand, the volumetric ratio (GOR).

In fact, in these diagrams, the thickness of the liquid layer has been reduced to the size without dimension $e/R_e - R_i$ where $R_e$ is the internal radius of the enclosure 1 and $R_i$ is the external radius of the shaft 4.

These curves show that, given the thickness e of the liquid layer and its axial velocity $V_L$, as well as the rotational velocity ω of the motor 3, firstly the volumetric ratio GOR and then the liquid feed $Q_L$ can be deduced, from which the gas feed can then be deduced.

If the volumetric ratio is too large, i.e. the thickness e is too small for the measurement carried out with the help of detectors γ 13 to be significant the processing unit 14 can control the operation of the pump 6, i.e. increase the feed $Q_L$, which has the effect of increasing the thickness e as results in FIG. 5. The unit 14 can also control a reduction of the rotational velocity which has the same effect on the thickness e, as results in FIG. 4. From the new values for e and $V_L$ obtained in this way one can deduce the volumetric ratio and the modified liquid feed and, given the difference in rotational velocity or the difference in liquid feed after and before the modification, revert to the thickness e and the velocity $V_L$ before modification.

In practice, measurments are carried out with a defined frequency, and any significant deviation of the current measurements from previous average measurements causes the starting of the pump 6 so as to increase the liquid feed or a modification to the rotational velocity of the motor 3 so as to carry out a precise measurement Of course the invention is not restricted to the embodiment described above to which various alterations and and modifications can be made without departing from the spirit of the invention.

We claim:

1. Process for measuring the flow of liquid and gaseous phases of an axially flowing two-phase fluid comprising, at a first location, rotating the flowing two-phase fluid around an axis defining its flow to generate a coaxial flow having an inner tubular layer formed by the gaseous phase, surrounded by an outer tubular layer formed by the liquid phase, measuring the thickness of the tubular layers of the liquid phase and gaseous phase at a location downstream from said first location, measuring the axial flow velocity of at least the liquid phase at a location downstream from said first location, and determining the flow volume of each phase and the volumetric ratio of the gaseous phase to the liquid phase of the two phase fluid, by comparison of the measured thicknesses and axial flow velocity with previously obtained data.

2. Process according to claim 1, wherein the thickness of the respective layers is measured by measuring the differential absorption of radiation in said phases.

3. Process according to claim 1, wherein the axial flow velocities are measured by Doppler effect.

4. Process according to claim 1, further comprising, the step of first changing the thickness of one of the layers, and then measuring the thickness of the respective layers and the flow velocity.

5. Process according to claim 4, wherein the step of first changing the thickness of one of the layers comprises, feeding additional liquid into the two phase fluid upstream of the first location to increase the thickness of the liquid layer, and than measuring the thickness of the respective layers and the axial flow velocity.

6. Process according to claim 4, wherein the step of first changing the thickness of one of the layers comprises, changing the speed of rotation of the two phase fluid, and then measuring the thickness of the respective layers and the axial flow velocity.

7. Process according to claim 4, wherein the thickness and velocity measurements are performed at predetermined intervals, and liquid is added when the thickness and axial flow velocity deviate from previously measured average values.

* * * * *